United States Patent Office 3,364,104
Patented Jan. 16, 1968

3,364,104
1,2-BIS(ALKYLMERCAPTO)ETHYLENES AS NEMATOCIDES
Edward W. Weil, Lewiston, N.Y., assignor to Hooker Chemical Corporation, Niagara Falls, N.Y., a corporation of New York
No Drawing. Filed Feb. 23, 1961, Ser. No. 90,963
24 Claims. (Cl. 167—22)

This invention describes certain unsaturated sulfur-containing organic compounds active against various types of plant parasites. More specifically, this invention relates to 1,2-bis alkyl mercapto ethylenes and their derivatives useful as nematocides. The active compounds of this invention have been found to be encompassed within the formula below:

$$RSCX = CYSR'$$

wherein R and R' which may be the same or different are lower alkyl radicals containing between one and four carbon atoms, and X and Y which may be the same or different are members of the group selected from hydrogen or halogen. The preferred compositions are those wherein the halogen is chlorine and R and R' are ethyl.

Among the many compounds that are intended to be within the scope of the present invention are the following representative compounds:

1,2-bis(methylmercapto)ethylene,
1,2-bis(ethylmercapto)ethylene,
1,2-bis(propylmercapto)ethylene,
1,2-bis(butylmercapto)ethylene,
1,2-bis(methylmercapto)chloroethylene,
1,2-bis(ethylmercapto)chloroethylene,
1,2-bis(propylmercapto)chloroethylene,
1,2-bis(butylmercapto)chloroethylene,
1,2-bis(methylmercapto)-1,2-dichloroethylene,
1,2-bis(ethylmercapto)-1,2-dichloroethylene,
1,2-bis(propylmercapto)-1,2-dichloroethylene,
1,2-bis(butylmercapto)-1,2-dichloroethylene,
1,2-bis(methylmercapto)-bromoethylene,
1,2-bis(ethylmercapto)bromoethylene,
1,2-bis(propylmercapto)bromoethylene,
1,2-bis(butylmercapto)bromoethylene,
1,2-bis(methylmercapto)-1,2-dibromoethylene,
1,2-bis(ethylmercapto)1,2-dibromoethylene,
1,2-bis(propylmercapto)-1,2-dibromoethylene and
1,2-bis(butylmercapto)-1,2-dibromoethylene.

The economic importance of plant-injuring insects and parasites, including nematodes, has risen in recent times. With the increased mechanization of farming, the per crop profit margin has declined, and successful farming depends upon volume production, requiring the fullest use of the land. Controlling the great variety of insects and parasites which attack commercial crops is a prime requisite in profitable farming. Considerable inroads have been made in controlling those insects which attack plants above the soil level. However, little success has been achieved in eradicating the nematodes which attack the plant below the soil level. The reasons for this lack of success are several. Many substances which would be effective against nematodes per se are leached out of the soil or diluted by rain, thus losing their effectiveness. Some species of nematodes are able to survive in the soil as cysts in spite of the presence of a nematocidal compound. Still another problem is the relatively narrow range between the phytotoxic dose and the nematocidal range of most nematocides. This toxicity problem has been overcome somewhat through the device of introducing the chemical several weeks before planting the crop, thus allowing the phytotoxic nematocidal material to dissipate naturally in the soil. Unfortunately, as previously discussed, with volume crops being utilized to a great extent, keeping the land fallow is not economically feasible. Another shortcoming of this waiting period is that in areas having a short growing season, the further shortening of the growing season precludes the growing of most crops. Crop rotation and cross hybridization to produce nematode resistant plants have also been tried with little commercial success. The former method is limited to instances where a suitable crop of equal economic value is available while the latter is both time consuming, costly and uncertain. Fumigants such as chlorodibromopropane and 1,3-dichloropropene which are among the most effective nematocidal agents, are often generally too phytotoxic to the desired crop to be used, or are too costly for use on all but the highest value crops.

Surprisingly enough, it has been found that the aforementioned 1,2-bis(alkylmercapto)ethylenes, which are known compounds which have not previously been known to be nematocidal in action, are in fact extremely potent nematocides with several attendant advantages. The ethyl mercapto ethylenes and dichloroethylenes are particularly active compared to the group generally. Other advantages are these nematocides may be applied by a variety of methods, including injection using a tube, mechanical discing, mixing with solid carriers such as clay, talc, silica, diatomaceous earth, chalk, mud or fertilizer, or the nematocides may be applied using a liquid carrier or diluent such as aliphatic ketones or esters, mineral oil, coal tar oil, or even water, to suspend or emulsify them. Another advantage of the inventive nematocidal compounds is their lack of phytotoxicity when applied to the soil. For example, potato plants which are readily attacked by *Heterodera roestochiensis* are unaffected when the inventive namatocides are applied to the soil. It has been further found that many ornamentals are also unharmed when treated with these nematocides. Still another advantage is the low rate of application required to observe a nematocidal effect. For example, it has been found that an application from five to fifty pounds per acre of active ingredients of soil is efficacious against various nematodes, such as *Meloidogyne incognita* if the entire area is to be treated. Obviously, the exact rate of application will depend on the severity of the infestation, soil type, and climatic conditions, and whether only the rows of plants will be treated. For example, the light sandier soils will require less nematocide while the heavy organic or clay soils will require a higher application rate. If the rows of plants alone are treated, the effective rate may be reduced to about one and one-half to twenty pounds per acre, again subject to the above limitations. Other advantages will become obvious from a further reading of the specification and the examples which follow.

The compounds of this invention are known as chemical intermediates and have been prepared by a process substantially the same as disclosed by Fromm et al. (Annalen 394, 325 (1912)). The process is set forth below.

*Example 1*

To a solution of two moles of sodium methoxide in methanol are added slightly over two moles of the ethyl mercaptan. This solution is then added to a refluxing solution of one mole of 1,2-dichloroethylene. The refluxing is continued until titration of an aliquot shows that two moles of chloride ion had been released. The reaction mixture is then cooled and filtered to remove salt and the liquid product is separated by distillation. The product 1,2 - bis(ethylmercapto)-dichloroethylene, after purification, boils at one hundred and thirty-three degrees centigrade at thirteen millimeters of mercury pressure.

*Example 2.—Preparation of other 1,2-bis(alkylmercapto)ethylenes*

The procedure of Example 1 is followed except that instead of ethyl mercaptan, the appropriate alkylmercaptan is added to the solution of two moles of sodium methoxide in methanol (or other lower alkali metal alkoxide), and the resulting mixture is added to a refluxing two mole solution of the haloalkylene or dihaloalyklene

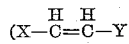

where X and Y correspond to hydrogen or halogen, as in the desired product). The refluxing is continued until two moles of chloride ion are released. The reaction mixture is cooled and filtered and the liquid product, separated by distillation. In many instances, the products were not distilled and the crude oil was used. The following products are prepared.

| Compound: | Boiling point (° C.) where available |
|---|---|
| 1,2-bis(methylmercapto) ethylene | 86–92/15 mm. of Hg. |
| 1,2-bis(ethylmercapto) ethylene | 104–105/15 mm. |
| 1,2-bis(methylmercapto) chloroethylene | 47–52/0.15 mm. |
| 1,2-bis(methylmercapto) dichloroethylene | 62–64/0.15 mm. |
| 1,2-bis(butylmercapto) chloroethylene | 97/15 mm. |
| 1,2-bis(propylmercapto) ethylene | Crude oil. |
| 1,2-bis(butylmercapto) ethylene | Do. |
| 1,2-bis(ethylmercapto) chloroethylene | Do. |
| 1,2-bis(propylmercapto) chloroethylene | Do. |
| 1,2-bis(methylmercapto)-1,2-dichloroethylene | Do. |
| 1,2-bis(propylmercapto)-1,2-dichloroethylene | Do. |
| 1,2-bis(butylmercapto)-1,2-dichloroethylene | Do. |
| 1,2-bis(methylmercapto) bromoethylene | Do. |
| 1,2-bis(ethylmercapto) bromoethylene | Do. |
| 1,2-bis(propylmercapto) bromoethylene | Do. |
| 1,2-bis(butylmercapto) bromoethylene | Do. |
| 1,2-bis(methylmercapto)-1,2-dibromoethylene | Do. |
| 1,2-bis(ethylmercapto)-1,2-dibromoethylene | Do. |
| 1,2-bis(propylmercapto)-1,2-dibromoethylene | Do. |
| 1,2-bis(butylmercapto)-1,2-dibromoethylene | Do. |

*Example 3.—Nematocidal activity of representative compounds of this invention*

Soil infested with *Meloidogyne incognita*, a root knot nematode, is admixed with the compound to be tested at the concentration expressed in grams per gallon. Cucumber seedlings are placed in the treated soil after three days of treatment. After two weeks the roots of the cucumber seedlings are examined for nematode damage, compared to cucumber seedlings planted in untreated infested soil. Table I gives the results that are obtained.

| Compound | Concentration of active compound, g.ms/ Gallon of Soil | Root Knot Rating* |
|---|---|---|
| 1,2-bis(methylmercapto)ethylene | 0.5 | 0–0.5 |
|  | 0.5 | 0.0 |
| 1,2-bis(ethylmercapto)ethylene | 0.25 | 0.5 |
|  | 0.125 | 2.0 |
| 1,2-bis(ethylmercapto)dichloroethylene | 0.125 | 0.5 |
| 1,2-bis(methylmercapto)chloroethylene | 0.5 | 0.1 |
|  | 0.25 | 1.0 |
| 1,2-bis(methylmercapto dichloroethylene | 0.5 | 0.5 |
|  | 0.25 | 1.0 |
| 1,2-bis(butylmercapto) chloroethylene | 0.5 | 2.5 |
| Untreated Control |  | 4.0 |

*Scale:
  0.0 = complete control (no damage).
  1.0 = good (economically useful) control (slight damage).
  2–3 = fair to weak control (moderate damage).
  4 = no control (severe damage).

We claim:
1. A method for controlling nematodes which comprises applying to the locus to be treated a nematocidal amount of a compound of the formula

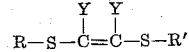

wherein R and R' are alkyl radicals of 1 to 4 carbon atoms and wherein X and Y are radicals selected from the group consisting of hydrogen and halogen.
2. The method of claim 1 wherein the nematocide is 1,2-bis (methylmercapto) ethylene.
3. The method of claim 1 wherein the nematocide is 1,2-bis (ethylmercapto) ethylene.
4. The method of claim 1 wherein the nematocide is 1,2-bis (propylmercapto) ethylene.
5. The method of claim 1 wherein the nematocide is 1,2-bis (butylmercapto) ethylene.
6. The method of claim 1 wherein the nematocide is 1,2-bis (methylmercapto) chloroethylene.
7. The method of claim 1 wherein the nematocide is 1,2-bis (ethylmercapto) chloroethylene.
8. The method of claim 1 wherein the nematocide is 1,2-bis (propylmercapto) chloroethylene.
9. The method of claim 1 wherein the nematocide is 1,2-bis (butylmercapto) chloroethylene.
10. The method of claim 1 wherein the nematocide is 1,2-bis (methylmercapto) dichloroethylene.
11. The method of claim 1 wherein the nematocide is 1,2-bis (ethylmercapto) dichloroethylene.
12. The method of claim 1 wherein the nematocide is 1,2-bis (propylmercapto) dichloroethylene.
13. The method of claim 1 wherein the nematocide is 1,2-bis (butylmercapto) dichloroethylene.
14. A method of combating nematodes which comprises applying to the soil a nematocide of the formula (RS)XC=CY(SR') wherein R and R' each represent the same or different alkyl radicals of 1 to 4 carbon atoms and X and Y each represent a radical selected from the group consisting of hydrogen and halogen.
15. The method as claimed in claim 14, wherein the nematocide is applied in admixture with a solid carrier by incorporating said mixture into the soil.
16. The method as claimed in claim 14, wherein the nematocide is applied by spraying on the soil an aqueous dispersion thereof.
17. A method of combating nematodes which comprises applying to the soil a nematocide of the formula (RS)ClC=CCl(SR') wherein R and R' each represent the same or different alkyl radicals of 1 to 4 carbon atoms.
18. The method as claimed in claim 17, wherein the nematocide is applied by spraying on the soil an aqueous dispersion thereof.

19. The method as claimed in claim 17, wherein the nematocide is applied in admixture with a solid carrier by incorporating said mixture into the soil.

20. A method according to claim 1, wherein the nematocide is applied at the rate of from 1½ to 50 pounds per acre.

21. A method according to claim 11, wherein the nematocide is applied at the rate of 1½ to 50 pounds per acre.

22. A method according to claim 14, wherein the nematocide is applied at the rate of 1½ to 50 pounds per acre.

23. A method according to claim 17, wherein the nematocide is applied at the rate of 1½ to 50 pounds per acre.

24. A method according to claim 21, wherein the nematocide is applied at the rate of about 1½ to 20 pounds per acre.

References Cited
UNITED STATES PATENTS

| | | | |
|---|---|---|---|
| 2,983,762 | 5/1961 | Gerjovich | 167—22 |
| 3,039,918 | 6/1962 | Hambsch | 167—22 |

ALBERT T. MEYERS, *Primary Examiner.*

J. LEVITT, I. MARCUS, W. B. KNIGHT, *Examiners.*

S. FRIEDMAN, *Assistant Examiner.*

UNITED STATES PATENT OFFICE
CERTIFICATE OF CORRECTION

Patent No. 3,364,104                                  January 16, 1968

Edward D. Weil

It is certified that error appears in the above identified patent and that said Letters Patent are hereby corrected as shown below:

In the heading to the printed specification, line 4, "Edward W. Weil" should read -- Edward D. Weil --. Column 2, line 49, "light" should read -- lighter --. Column 3, line 16, "dihaloalklene" should read -- dihaloalkylene --. Column 4, line 7, "g.ms/" should read -- gms/ --; line 14, "(methylmercapto" should read -- (methylmercapto) --; lines 26 to 28, the formula should appear as shown below:

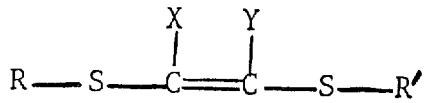

Signed and sealed this 10th day of March 1970.

(SEAL)
Attest:

EDWARD M. FLETCHER, JR.                        WILLIAM E. SCHUYLER, JR.
Attesting Officer                                  Commissioner of Patents